US005520989A

United States Patent [19]

Podosek

[11] Patent Number: 5,520,989

[45] Date of Patent: May 28, 1996

[54] RECYCLABLE PRINT-TINTED PAPER

[75] Inventor: Edward Podosek, Wilbraham, Mass.

[73] Assignee: Avery Dennison Corporation, Pasadena, Calif.

[21] Appl. No.: 987,479

[22] Filed: Dec. 7, 1992

[51] Int. Cl.[6] .......................... B32B 3/00

[52] U.S. Cl. .......................... 428/195; 428/201; 428/211; 428/537.5; 428/918

[58] Field of Search .......................... 428/195, 201, 428/211, 918, 452, 537.5; 395/108, 454; 358/78, 75; 346/1.1

[56] References Cited

U.S. PATENT DOCUMENTS 4,600,629 7/1986 Knapp et al. .......................... 428/201
4,680,645 7/1987 Dispoto et al. .......................... 358/298
4,965,610 10/1990 Ishikawa .......................... 346/1.1
5,175,804 12/1992 Wittmann .......................... 395/108

*Primary Examiner*—Patrick J. Ryan
*Assistant Examiner*—W. A. Krynski
*Attorney, Agent, or Firm*—Kriegsman & Kriegsman

[57] ABSTRACT

A sheet of writing paper which is white, but which has been colored, or tinted to a pastel color by printing on its surface with a strippable or chemically removable ink. The surface printing with ink allows the paper to have a desirable tinted color, but allows the color to be easily removed so that the paper can be relatively easily recycled and reused without the normal problems associated with recycling of vat-dyed tinted papers. The surface printing can be accomplished by printing a random spotted pattern on the paper to provide for the perception of tinting. The invention allows the printed pattern to have a random-toned effect or allows the visual incorporation of words or symbols which would very subtly appear, macroscopically, in the tinting pattern.

9 Claims, 5 Drawing Sheets

RECYCLABLE PRINT-TINTED PAPER

BACKGROUND OF THE INVENTION

It has been found very desirable to tint sheets of writing paper, especially sheets which are formed into pads of lined paper sometimes called "legal pads". The traditional yellow color, and later a pastel green, have now yielded to a whole spectrum of pastel colors which are available in these pads of writing paper. In addition to the general consumer preference for pads of tinted writing paper and sometimes individual consumer preferences for a specific color or shade, there is evidence and certainly the perception that certain tinted colors can significantly reduce eye strain by reducing glare in certain light environments and in providing a more visually effective surface for different kinds and colors of writing ink.

The standard method for the manufacture of pads of tinted writing paper is to begin with sheets of vat-dyed paper. These sheets were dyed during the process of their manufacture in order to achieve permanent coloring and to achieve uniform coloring.

One of the significant problems with the use of vat-dyed paper as a starting point for pads of tinted writing paper is that it is extremely difficult to remove the color dye from the paper in order to recycle the paper for reuse. In fact, using present dye extraction technology, it is impossible, as a practical matter, to effectively remove the color. Among other problems with this situation, is that, if one were to attempt to recycle colored paper, in a plan which would not necessarily remove all of the dye, it would be necessary to separate and separately recycle each of the various shades of each of the various colors. Otherwise, the resulting mixed color products would have inconsistent and probably undesirable colors. As a result, it is essentially impractical to attempt to recycle vat-dyed writing paper into any uses other than those for which color is not an issue. Unfortunately, for recyclers, those kinds of uses are generally of very low value. This problem is not necessarily present in white paper and the economics of recycling white paper back through the high value writing paper cycle has much more favorable economics and practicality.

Another difficulty with the manufacture of pads of tinted writing paper is that the mills which manufacture the paper tend to manufacture the specific color and tint of the paper in specific mill runs. As a result, a specific color of paper may only be available at certain times when the mill feels it is appropriate to set up to run that color. Thus the paper processor who wishes to make pads of colored writing paper cannot rely on the timeliness of the sources of paper. The result is that the paper processor typically must purchase the colors that he wishes when they are available and stockpile them based on projections of need. Furthermore, this special scheduling and storage problem causes the cost of these tinted papers to be significantly greater than one would expect compared to the cost of white paper.

These and other difficulties experienced with the prior art products have been obviated in a novel manner by the present invention.

It is, therefore, an outstanding object of the invention to provide a tinted writing paper which can easily and inexpensively be recycled for reuse as writing paper or other high value paper product.

Another object of this invention is the provision of a tinted writing paper which is formed from standard white paper stock.

A further object of the present invention is the provision of tinted paper which can be controlled in its color by the writing pad manufacturer without reliance on the coloring activities of the paper manufacturer.

It is another object of the present invention to provide tinted paper which can incorporate into its tinting function, either certain textures of color or patterns which either display words or symbols.

A still further object of the invention is the provision of tinted paper which provides the writing pad manufacturer with maximum control over his product.

With these and other objects in view, as will be apparent to those skilled in the art, the invention resides in the combination of pans set forth in the specification and covered by the claims appended hereto.

SUMMARY OF THE INVENTION

This invention involves a product and method for replacing the standard tinted writing paper typically used for pads of lined writing paper. Essentially, sheets of plain white paper are printed, not only with lines typically associated with this type of product, but also with a pattern of tinting which gives the surface of the paper the appearance of a traditional vat-dyed paper. Because the tint is applied as a printed ink on the surface of the paper, rather than as a dye which is incorporated throughout the volume of the paper, it is relatively simple to remove the tint from waste paper and restore the waste paper to essentially a white paper condition. This resulting white refuse paper, or pulp, can easily be recycled and reused as white writing paper either for white writing paper itself or as a starting material for recycling this process in essentially a closed loop recycling method.

It has been found that this method is most effective if the tint is applied as a pattern of spots covering approximately 40% to 50% of the paper surface. The spots can be either random or can be formed into a pattern which gives the appearance of a water mark or other symbol or word. Depending on the design of the tint pattern, a random tint texture, a micro-level pattern formed of spots in the shape of logos, or a macro-level version in which the patterns form sheet size symbols, can provide very attractive and interesting visual effects while providing the essential desirability and ergonomic benefits associated with the tinted papers.

In its most desirable form, the pattern would be printed using "soft inks", that is, inks which can be easily stripped from the surface of the paper using appropriate stripping chemistry. Ideally, the inks would be organic in nature, or bio-compatible, and preferably even recyclable themselves, in order to allow the tinted writing paper product to have minimal negative environmental effects.

Of particular benefit in the practical recycling process is the fact that the stripping of the ink would allow the mixing of various colors of tinted paper, all of which would have to be manufactured using this invention, and since all the ink would be removed, the resulting white paper could simply be recycled back into the initial process. As a result, this particular kind of tinted paper could simply be mixed in with other white paper for very effective and economical recycling.

In addition to the environmental benefits, this invention offers the paper processor significant economic advantages, because he can essentially purchase all his needs as white paper from the paper manufacturer. He can then create the tinted paper at the same time that he is printing the writing lines on the paper, which is then converted into pads. The paper processor, therefore, has total control over his paper needs and can even control the particular shades of color that he decides to use in connection with his products. Furthermore, the opportunities for incorporating his, or his customers' logos, into the tinting pattern provides additional benefits to the paper processor.

BRIEF DESCRIPTION OF THE DRAWINGS

The character of the invention, however, may best be understood by reference to one of its structural forms as illustrated by the accompanying drawings, in which.

DESCRIPTION OF THE PREFERRED EMBODIMENT

Figure 1:
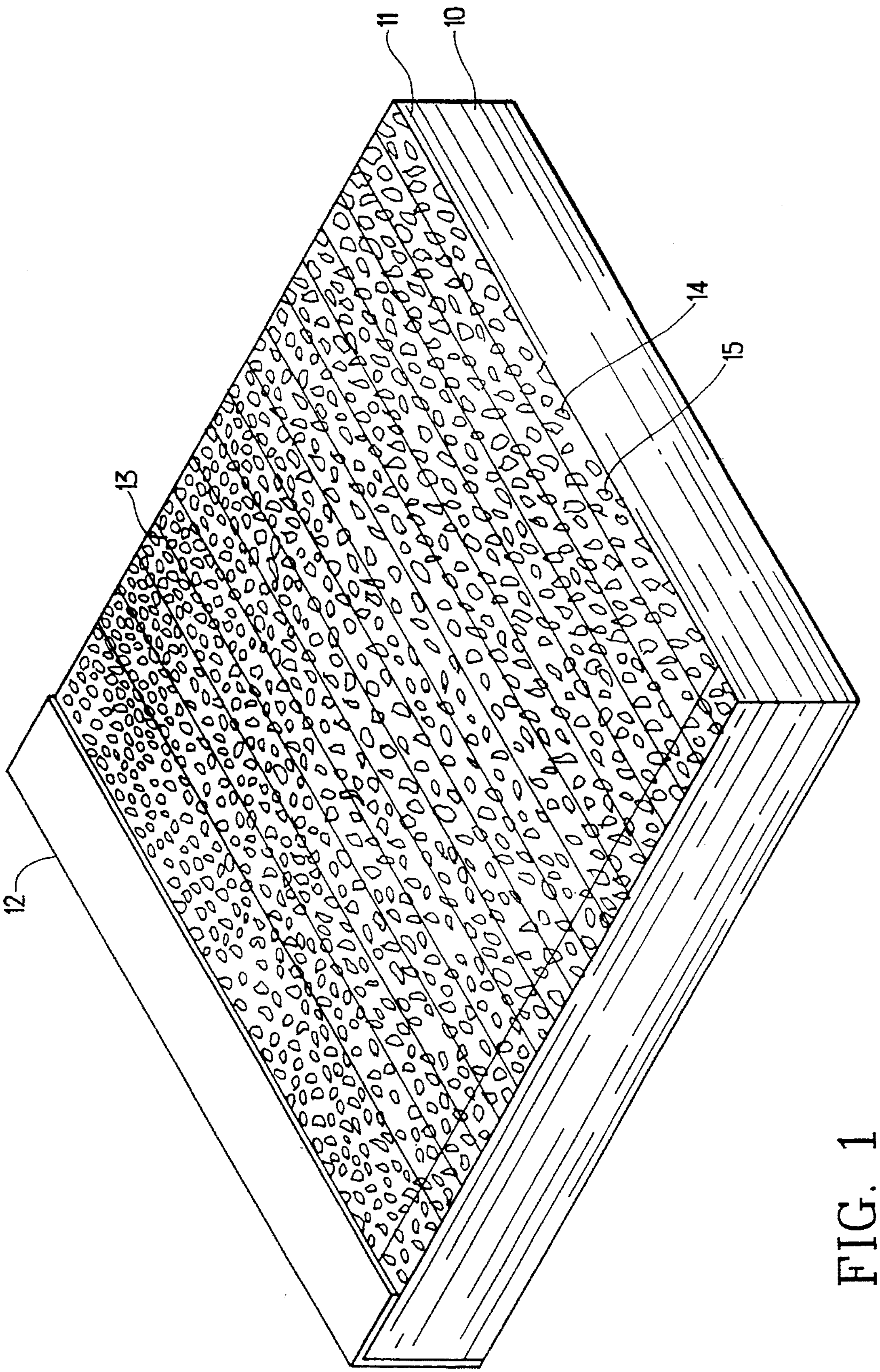
FIG. 1 is a perspective view of a pad of writing paper on which the tinting pattern of the present invention has been printed.

The nature of this invention can best be understood by reference to the structural form of the preferred embodiment set out in FIG. 1. The embodiment is shown as a pad 10 of sheets 11 of writing paper. The sheets 11 are bound together along an edge 12, but are separable by means of perforations or other means. Each sheet of paper is printed with writing lines 13 and with a tinting pattern 14. The timing pattern 14 is formed by printing individual spots 15. Each spot can be either randomly shaped or can be consistently shaped either as a single random shape or as a visual symbol. The spots 15 can be either randomly located across the surface of the paper, or can be located in such a way that the aggregate of the spots can form a visual pattern, or visual symbol, similar to a water mark. Although the invention can be effectuated with spot coverage as low as 10% of the surface of the paper and as high as 100% of the surface of the paper, the benefits of the invention can very preferably occur if the surface coverage is between 40% to 50%. To optimize the benefits of this invention, it is desirable to use as little ink on the surface as is possible while still achieving the visual tinting effect desired by the consumer. On the other hand, the color density of a given printed area is best if that color density is above a certain minimum level. Otherwise, the printing within the spot itself tends to be non-uniform and tends to create an undesirable visual impression. Thus, the color density of the individual spots and the percent of surface which the spots cover should be optimized to achieve the maximum desirable visual effect while at the same time minimizing the amount of ink which must be stripped off the paper in order to turn the paper into a white paper product which can be easily recycled.

Figure 2:
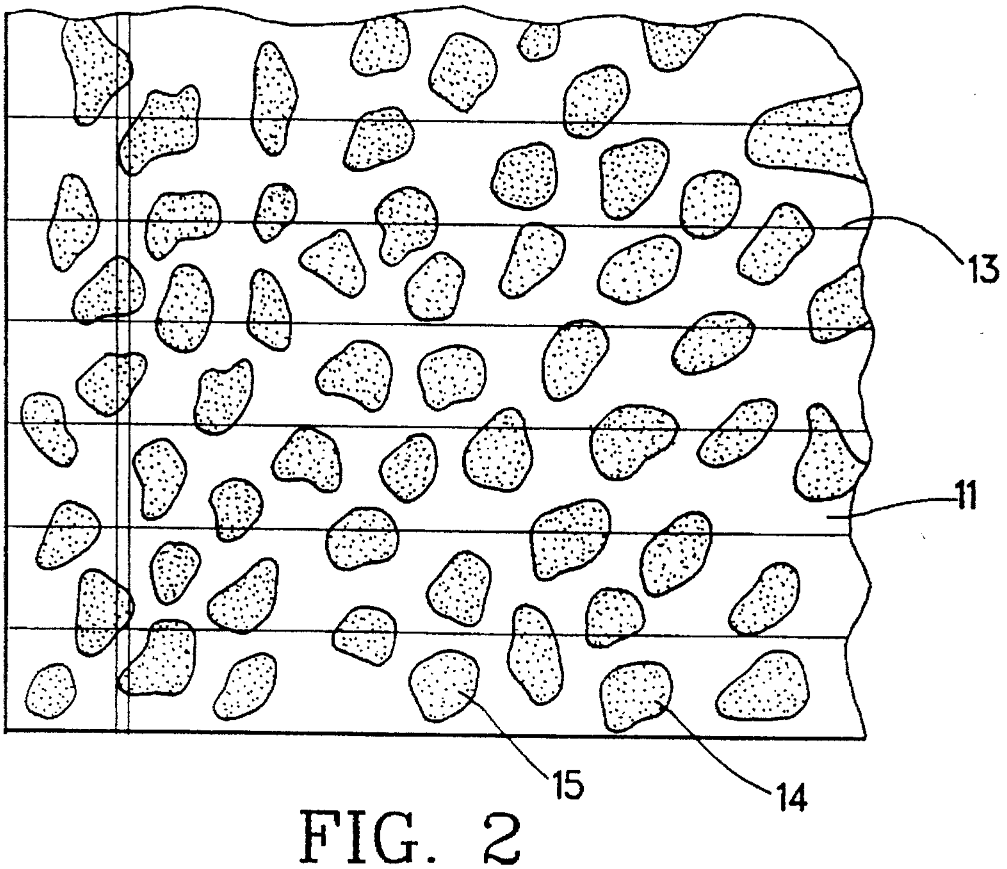
FIG. 2 is a close-up view of the printing paper shown in FIG. 1.

FIG. 2 shows a close-up of the corner of the pad on FIG. 1 and shows a more clear view of a random pattern of random spots 15. Although FIG. 2 portrays the spots as stippled regions bounded by a black fine, the spots of the preferred embodiment are spots of transparent or translucent color of a light uniform shade, without borders. Although the spots can be very irregular in shape, they preferably have average diameters in the one millimeter range.

Figure 3:
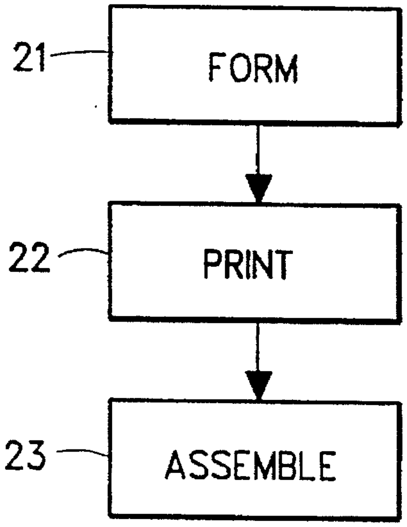
FIG. 3 is a flow chart showing the basic process involved in the present invention.

FIG. 3 shows a flow chart setting out a process embodying the principles of the present invention. In step 21, standard white writing paper is formed by the paper manufacturer. In step 22, the paper processor prints the surface of the white paper with lines and a tinting pattern which is described above. In step 23, the sheets of tinted writing paper are assembled into a pad.

Figure 4:
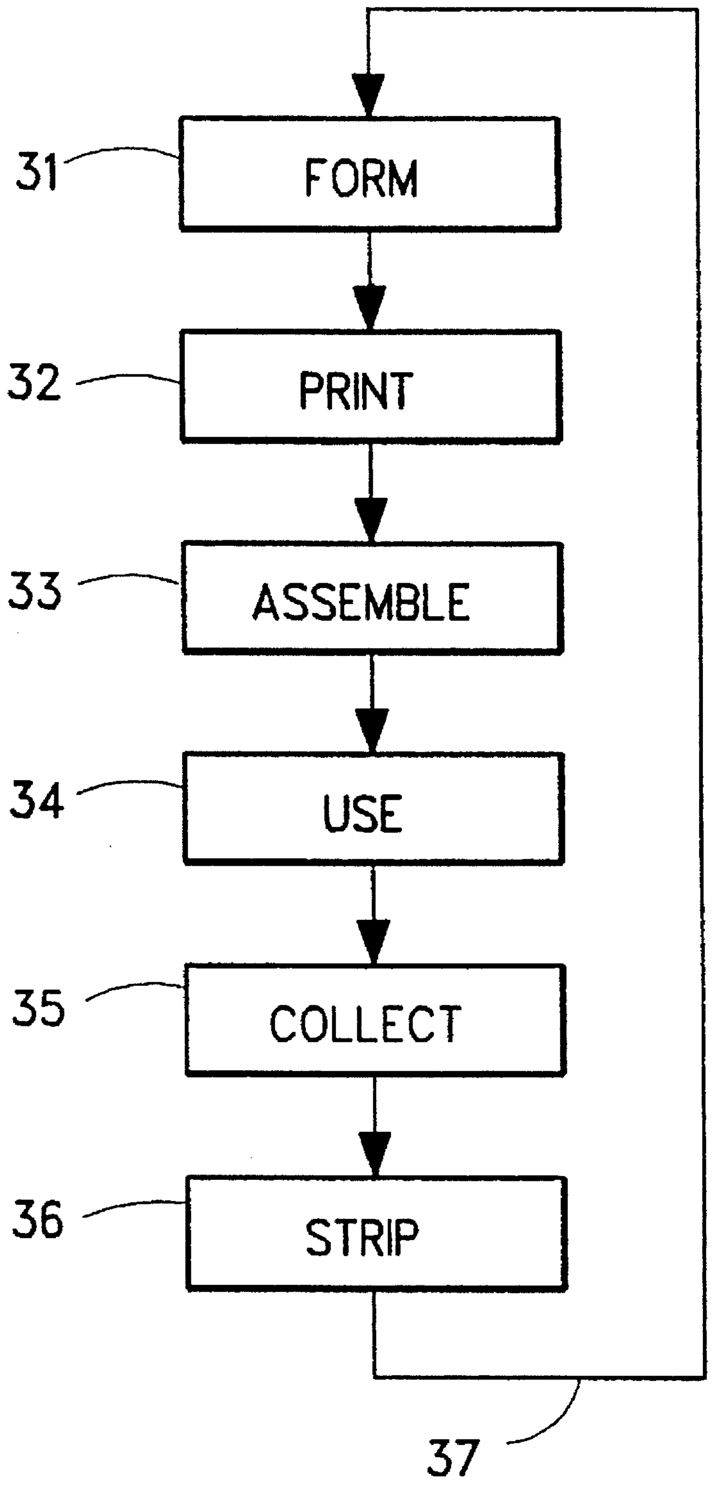
FIG. 4 is a flow chart showing a simple closed loop recycling scheme embodying the principals of the present invention.

FIG. 4 shows a simple closed-loop recycling system which embodies the principles of the present invention. Step 31 represents the formation of standard white writing paper by the paper manufacturer. Step 32 present the process by which the paper processor will print the surface of the paper with the printing pattern described above. Step 33 involves assembling the tinted paper into pads. In step 34, the consumer would use the paper. In step 35, the paper would be collected by the recycler. In step 36, the paper would be processed, including a step for stripping the ink from the paper. The paper would thereafter be recycled, in step 37, as a starting material or pulp for the formation process of step 31.

Figure 5:
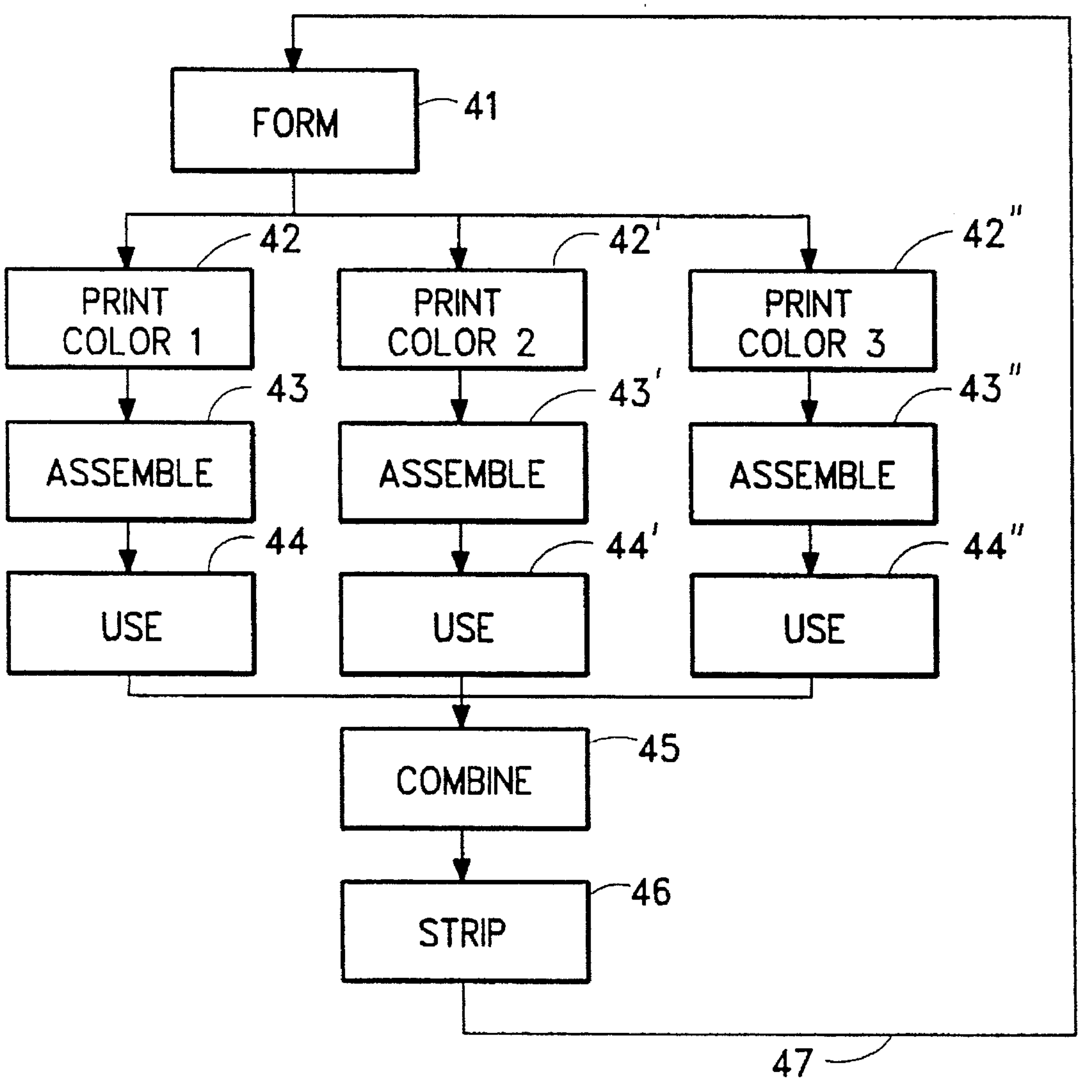
FIG. 5 is a flow chart showing a multi-color, closed-loop, recycling scheme embodying the principles of the present invention.

FIG. 5 shows a closed-loop recycling system for recycling several different colors of print-tinted paper. In Step 41, standard white writing paper is formed by paper manufacturer. In step 42, 42' and 42", the white paper would be printed with various tint patterns, each of a different color. The result would be batches of writing paper, each of which is tinted a different color. In step 43, 43' and 43", the paper would be assembled into writing pads. In step 44, 44' and 44", the consumer would use the writing paper. In step 45, all three of the colors would be collected and combined into a single refuse batch. In step 46, the batch with all the different colors would be subjected to a stripping process which would remove the ink of all the different colors and result in a batch of white paper pulp. The white pulp would be returned, by step 47, to step 41, to be reused as white writing paper base.

In the preferred embodiment, each spot 15 of the tinting pattern 14 would be random in size and shape and would have a random position across the sheet of paper. The spots would take up between 40%–50% of the paper and would be printed with sufficient density so that each spot would be relatively uniform in color density within itself. The tinting pattern would be printed using conventional printing equipment, and, in the preferred embodiment, would actually be applied on the same equipment as, and simultaneously with, the printing of the lines used for writing.

In the preferred embodiment, the tinting pattern would be formed employing an ink, and more specifically, an ink formed of relatively inert pigments in a liquid carrier. The carrier would dry and adhere the pigments to the surface of the paper to cause the printing effect. However, the ink would be adapted so that it would be relatively easy to strip the carrier and pigment from the surface in the recycling process. Ideally, both the pigment and the carrier would be environmentally compatible in order to maximize the benefits of this invention.

Figure 6:
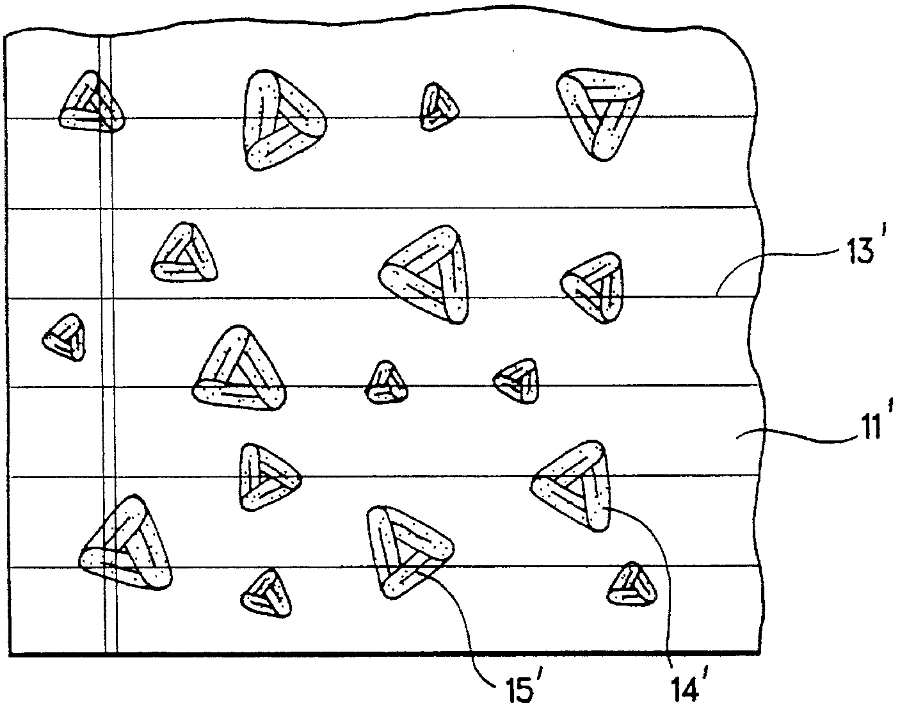
FIG. 6 is a second variation of the tinting pattern.
Figure 7:
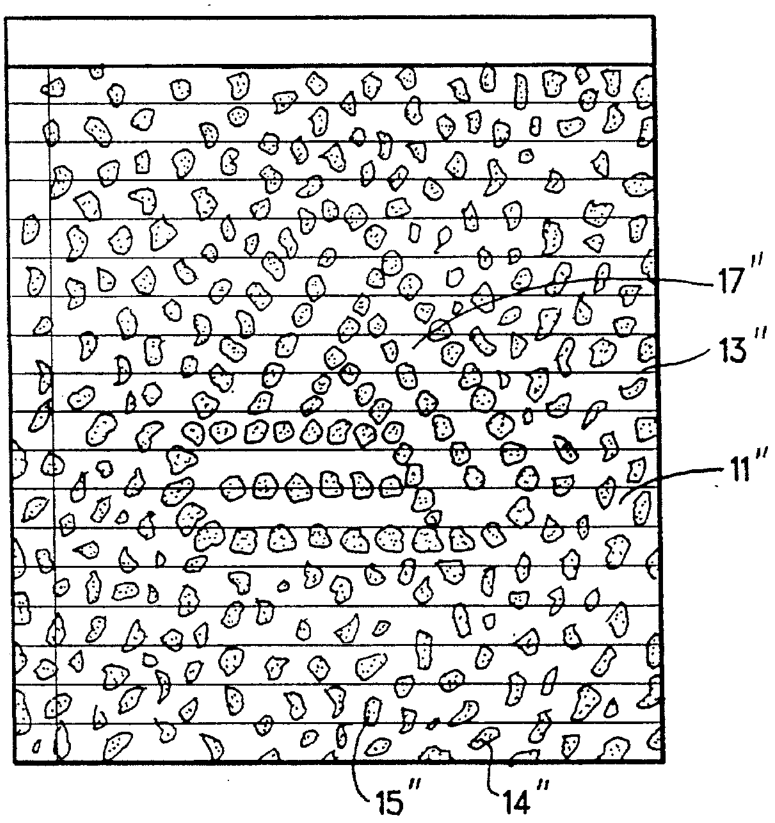
FIG. 7 is a third variation of the tinting pattern.

Although the spots 15 can be random in size in shape and in position on the paper, the invention contemplates achieving the tinting effect by printing randomly or shape-oriented spots each of which is itself a visual image such as a logo. FIG. 6 shows randomly positioned logo-type spots 15' in tint pattern 14'. FIG. 7 shows psuedo-randomly positioned random-shaped spots 15" in tint pattern 14", with a perceivable image 17" embedded into the pattern.

It is obvious that minor changes may be made in the form and construction of the invention without departing from the material spirit thereof. It is not, however, desired to confine the invention to the exact form herein shown and described, but it is desired to include all such as properly come within the scope claimed.

The invention having been thus described, what is claimed as new and desired to secure by Letters Patent is:

1. Color-tinted paper comprising:

(a) a sheet of white paper having a first surface, and (b) a plurality of colored spots printed on said first surface and randomly distributed thereover so as to cause the entirety of said first surface of the sheet of white paper to appear tinted, said plurality of colored spots covering at least about 10% of said first surface and being formed using one or more inks which can be stripped from the sheet of white paper during recycling.

2. The color-tinted paper as recited in claim 1 in which said plurality of colored spots cover between 40% and 50% of said first surface.

3. The color-tinted paper as recited in claim 1 wherein said plurality of colored spots have an average diameter of about 1 mm.

4. The color-tinted paper as recited in claim 1 wherein said plurality of colored spots are identical in shape.

5. The color-tinted paper as recited in claim 4 wherein said shape is a logo.

6. The color-tinted paper as recited in claim 1 wherein said plurality of colored spots are randomly shaped.

7. The color-tinted paper as recited in claim 1 wherein said plurality of colored spots are random both in size and in shape.

8. The color-tinted paper as recited in claim 1 wherein each of said plurality of colored spots is relatively uniform in color density.

9. The color-tinted paper as recited in claim 1 wherein said plurality of colored spots cover 90% of said first surface.

* * * * *